US008039978B2

(12) United States Patent
Gillett

(10) Patent No.: US 8,039,978 B2

(45) Date of Patent: Oct. 18, 2011

(54) RENEWABLE ENERGY POWER SYSTEM

(75) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 255 days.

(21) Appl. No.: 12/321,148

(22) Filed: Jan. 21, 2009

(65) Prior Publication Data

US 2010/0181780 A1 Jul. 22, 2010

(51) Int. Cl.
*F03D 9/00* (2006.01)

(52) U.S. Cl. .......................................... 290/44; 290/55

(58) Field of Classification Search ............. 290/44–45; 180/2.1, 165, 65.3, 7, 4.2, 4.3, 4.5; 416/55, 416/132 B, 1; 60/398

See application file for complete search history.

(56) References Cited

U.S. PATENT DOCUMENTS 5,206,537 A * 4/1993 Alejandro et al. ............ 290/1 R
5,931,249 A * 8/1999 Ellis et al. ..................... 180/165
6,808,366 B2 * 10/2004 Sikes ............................... 416/1
7,132,760 B2 * 11/2006 Becker ............................ 290/55
7,215,037 B2 * 5/2007 Scalzi ............................. 290/55
7,579,701 B1 * 8/2009 White .............................. 290/43
2005/0001433 A1 * 1/2005 Seelin ............................. 290/44
2007/0163829 A1 * 7/2007 Ellis ............................... 180/165
2009/0191057 A1 * 7/2009 Knutson .......................... 416/23

* cited by examiner

*Primary Examiner* — Michael Zarroli

(57) ABSTRACT

A renewable energy power system comprised of a controller that supervises wind turbines in either a building or vehicle. Vertical or horizontal turbine assemblies with clockwise and counter clockwise generator systems that produce AC & DC power. Batteries and battery charger that are used in conjunction with another controller to provide an emergency source of power.

1 Claim, 3 Drawing Sheets

RENEWABLE ENERGY POWER SYSTEM

CROSS REFERENCED TO RELATED APPLICATIONS

Application Ser. No. 11/079,729, Publication number: US 2006/0210400 A1.

STATEMENT REGARDING FEDERALLY SPONSORED RESEARCH & DEVELOPMENT

Non Applicable

REFERENCE TO SEQUENCING LISTING, TABLE, OR COMPUTER PROGRAM CD

Non Applicable

FIELD OF THE INVENTION

Technical Field

This application relates to a system comprising a wind turbine coupled with electricity generator apparatus to generate renewable energy power.

BACKGROUND OF THE INVENTION

Related Art

As related art search discloses, it is generally well known that there have not been produced over the past years a vast quantity of generator alternatives utilizing wind power to furnish wind generated electrical energy for buildings and for electric transportation. Related embodiments may be similar but not as effective. Other vehicles rely on petroleum powered engines to charge the battery pack. Also, Hybrid vehicles, electric vehicles and buildings rely on electrical grid power, which uses coal. Agriculturally grown bio fuels and mirror farms waste water. Transmission power lines, solar farms, giant wind turbine farms, and underwater turbine generators have a negative impact on natural habitat and wildlife from excessive infrastructure.

The related art above describes a wind turbine with a spiral blade to crank a generator. The related art above does not discuss or describe employing a renewable energy power system comprising more than one wind turbine with two coupled electricity generating apparatus one that rotates in a clockwise direction, and the other rotates in a counter clockwise direction, and therefore both generate electrical voltage having (A/C) or (D/C) range options.

The related art above does not discuss employing a renewable energy power system controller that provides a specific step to monitor a wind turbine sensor so shaft rotational torque is per predetermined torque calibrations, thereby to break and prevent over rotational damage, and therefore correctly operate auxiliary wind turbine apparatus to therefore produce renewable electric energy power.

The related art above does not discuss or describe employing a renewable energy power system that utilizes a controller to furnish a desired voltage for vehicle applications, and can furnish ample voltage directly to an electric motor, or directly to building applications and also, monitors batteries and battery charging assembly. Also a controller manages secondary power storage and unspent electrical energy to dump load to furnish a desired voltage for vehicle operations, and furnish ample voltage directly to an electric motor or directly to building applications and furnish emergency power for another desired use.

SUMMARY OF THE INVENTION

The present invention provides various advantages as described below in which a renewable energy power system furnishes electricity for transportation or a building thereby, multiple wind turbine assemblies are placed where wind energy is concentrated and accelerates within, whereby a rod extending there through is rotationally driven and thereby providing torque to crank connecting both electricity generating apparatus located on each shaft ending. Subsequently rotating on one shaft end is a generating electricity device having a clockwise rotational direction and also a coupled onto the other shaft end is a generating electricity device having a counter clockwise rotational direction also both have a desired (A/C) or (D/C) voltage range option.

A renewable energy power system employs renewable energy power for the transportation industry and the shipping industry, manufacturing industries and for other modes of transportation having a commercial design employing at least one system.

For the purpose of improving energy technology for a recreational vehicle, or truck, or vessel, more than one wind turbine and electricity generator assemblage can be employed for power storage and therefore a controller to furnish power to at least one electric motor having a desired voltage.

A renewable energy power system whereby employing a method of operation comprising a vehicle controller sending ample voltage directly to an electric motor and having equivalent voltage to properly operate, and thereby vehicle function is carried out, and said controller enables secondary battery storage providing power for transportation applications and also said controller can direct unspent power to dump load and send power back to the electrical grid as a means to benefit the consumer.

A method for controller mode to facilitate a renewable energy power system thereby having a controller to furnish a desired voltage for vehicle applications, and furnish ample voltage directly to an electric motor, or directly to building applications, and also monitors batteries and battery charging assembly. Also a controller manages secondary power storage and directs unspent electrical energy to dump load to furnish a desired voltage for vehicle operations, and furnish ample voltage directly an electric motor or also, furnish ample voltage directly to a building application as well as furnish emergency power and electrical power via cable or plug, and supplies secondary battery storage for another desired use.

BRIEF DESCRIPTION OF THE DRAWINGS

These and other objects and advantages of the present invention will become more fully apparent from the following detailed description when read in conjunction with the accompany drawings with like reference numerals indicating corresponding parts throughout, wherein.

DETAILED DESCRIPTION OF THE PREFERRED EMBODIMENTS

Figure 1:
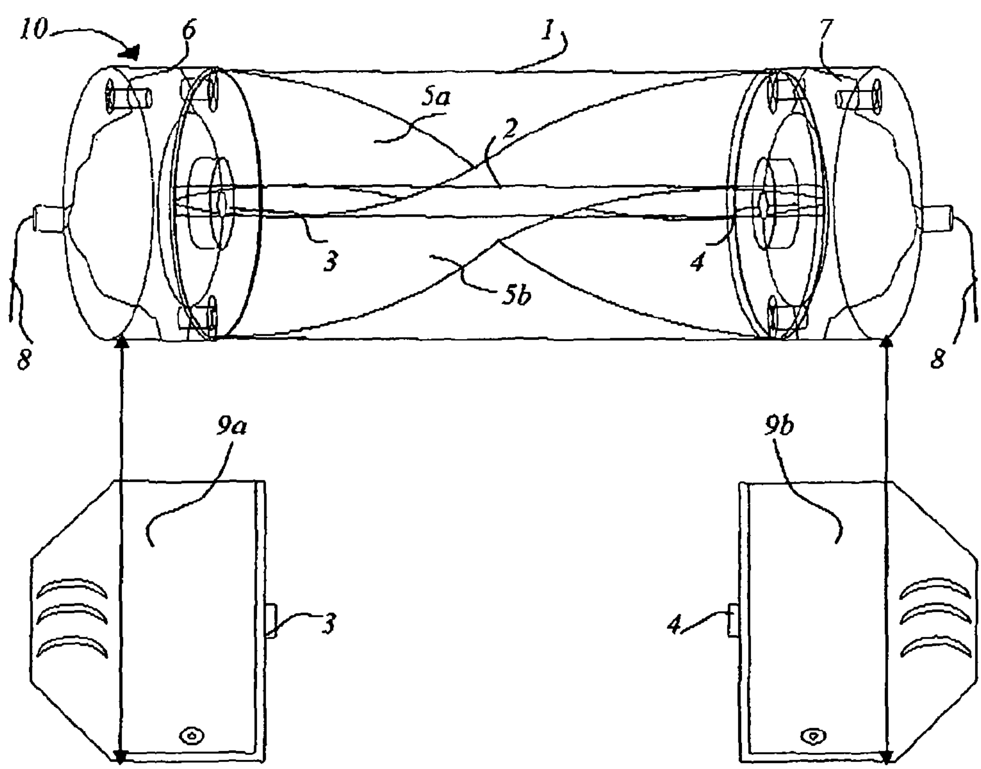
FIG. 1, a renewable energy power system illustration of a wind turbine assembly 10.

Hereinafter, a renewable energy power system of the embodiments in the present invention will be described in detail with reference to the drawings. The identical parts in the drawings are assigned the same reference numerals.

Referring now in greater detail in FIG. 1, a renewable energy power system illustrates a configuration of a single wind turbine which includes, a turbine framework 1, an elongated stabilized shaft 2, extending there through that can rotate about an axis. Also a control means for engaging or disengaging a brake to prevent mechanical damage (not shown), and blades 5*a* & 5*b*, shaft bearings 3, and 4, coupled with duo electricity generators 6, and 7, and encasements 9*a*, 9*b*, and cable connections 8. A wind turbine assembly 10, to transfer energy for a desired rotational speed and torque to crank both connecting electricity generating apparatus 6 rotating in a clockwise direction and, electricity generating apparatus 7 rotating in a counter clockwise direction and located on each said shaft 2 end. Both connecting electricity generators 6, 7, having a desired voltage range option, and couplinqwith a controller 11. For a building application, said wind turbine shaft 2, can include a coupled gear box (not shown).

Figure 2:
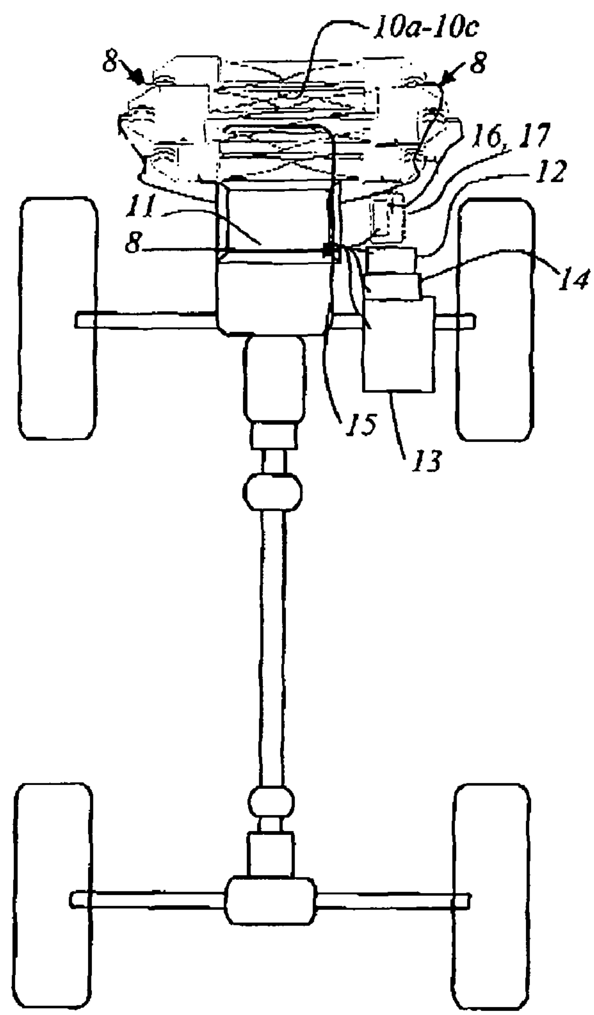
FIG. 2, a renewable energy power system illustration of an example of a method configuration for vehicle transportation 18.

Referring now in greater detail in FIG. 2, a renewable energy power system illustrates an exampled configuration for transportation vehicle 18, to move forward activating said wind turbine assembly 10*a*-10*c*.Thus electrical energy travels through said conductive cables 8, located throughout said system and subsequently couples with said controller 11, to furnish a desired voltage for vehicle 18, applications, and electrical devices, and furnishing ample voltage to at least one electric motor 15. The controller monitors batteries 13, 14, and battery charging assembly, a dump load controller 16, and manages secondary power storage 13, and unspent electrical energy to furnish a desired voltage for said vehicle 18, Furnishing ample voltage directly to said electric motor 15, or directly to building applications 20, and furnishing emergency power to dump load and providing an out source power cord with plug 17, for emergency power access or unspent power via access cable 19, for another use.

Figure 3:
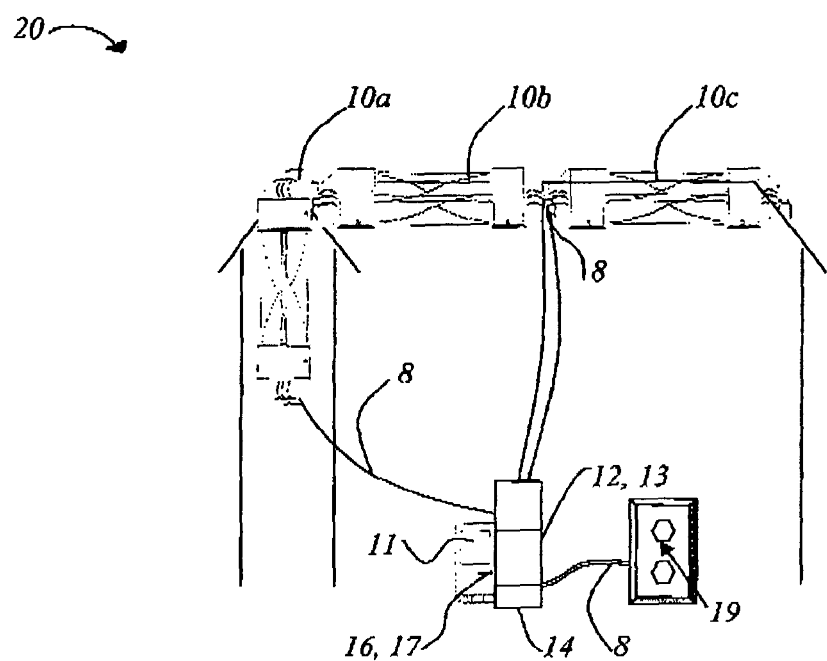
FIG. 3, a renewable energy power system illustration of an example of a method configuration for a household or building 20.

Referring now in greater detail in FIG. 3, a renewable energy power system illustrates an example of a configuration for a building 20, having a structure to support said wind turbine assemblage 10*a*-10*c*. The controller is to monitor systems for electricity generating apparatus 6, and 7, and furnish ample voltage directly to building applications thereby providing local electricity power to operate electrical applications. Said controller mode is to monitor systems of said battery charger device 14, battery 12, and secondary battery storage 13, and electricity generators 6, 7. There is also an electrical cable plug 19, as well as said dump load controller 16. This controller directs unspent power to be accessed for emergency power via cable and plug 19 for consumer applications or whereby is sent back to the electrical grid.

While various embodiments have been described, it is apparent to those skilled in the art that many more entailed nuances are possible within the spirit of the invention.

What is claimed is:

1. A wind turbine power system that is to be used in a vehicle or building structure to provide electrical power, the system comprising:

a wind turbine assembly that includes a shaft, blades, bearings, and is positioned either horizontally or vertically, a clockwise and counter clockwise rotational electricity generator system that provides both AC and DC power, whereby separate generators are mounted proximate opposite ends of the turbine shaft, internal and external cable connection assemblies, a controller that manages the system providing power to either the building or vehicle and, preventing over rotating torque of the turbine with a braking arrangement and, directing unused electricity to the power grid, a battery and, battery charger that are used with another controller to provide a secondary emergency source upon need of power through a power cord and plug.

* * * * *